UNITED STATES PATENT OFFICE.

GEORGE D. COLEMAN, OF BROOKLINE, MASSACHUSETTS, ASSIGNOR TO EDWARD D. COX AND JULIUS HOLLANDER, OF BOSTON, MASSACHUSETTS.

PAINT.

No. 903,675.  Specification of Letters Patent.  Patented Nov. 10, 1908.

Application filed January 31, 1905. Serial No. 243,503.

*To all whom it may concern:*

Be it known that I, GEORGE D. COLEMAN, a citizen of the United States, residing at Brookline, in the county of Norfolk and State of Massachusetts, have invented certain new and useful Improvements in Paint; and I do hereby declare the following to be a full, clear, and exact description of the invention, such as will enable others skilled in the art to which it appertains to make and use the same.

The present invention relates to an improvement in paints.

The present invention contemplates a copper or other metal-bearing paint in which the defects of prior existing paints have been overcome and which secures hitherto unapproached advantages. In the first place the body of the paint is such that it will carry an enormous proportion of metallic particles producing a paint which is the first, so far as the inventor is aware, to exhibit a bright metallic luster on being brushed or rubbed. Secondly, this paint, because of the carrying power of its body, will support the metallic particles in suspension for such reasonable length of time as to afford ample opportunity to apply it without substantial change between the top and bottom of the pail so that the surface is covered uniformly. The further quality of the paint, and one which recommends it especially for ease of application, is the facility with which it flows under the brush.

This invention consists in the paint hereinafter described and particularly defined in the claims.

The preferred ingredients of the paint and the preferred proportions of each are as follows:

Lead hydrate ($Pb(OH)_2$) __ 2 lbs.
Silica ($SiO_2$, pulverulent) __ 3½ "
Granulated copper (80 mesh) 7 "
Varnish (commercial) _____ 3 pts.
Linseed oil (raw) _____ 1 "

The lead hydrate is preferably the commercial pigment in a finely divided or powdered condition. The silica is preferably the commercial form of powdered silica known in the paint trade as " silex ". The granulated copper consists of fine angular particles of copper filings, and it is preferred that the copper filings should be subjected to a trituration process, which consists in tumbling the copper filings with sharp sand, whereby the copper particles are cleaned and cut into small rough-surfaced particles. The separation of the sand used in the process is conveniently effected by washing. The best size of granulated copper is 80-mesh. Any ordinary varnish and raw linseed oil may be employed. The lead hydrate and the varnish and linseed oil combine more or less to form an insoluble lead soap, which when mixed for use is of a somewhat gelatinous consistency. The ingredient of varnish makes for toughness, capacity of resistance to water and smoothness of surface. The presence of the silica, which is a metal supending ingredient, in the paint contributes in a peculiar manner to the carrying capacity of the mixture of lead hydrate, varnish and linseed oil. The silica renders the movement of the particles of copper over each other more easy, thereby contributing largely to its flowing qualities. This quality is attributed, by the inventor, to the entering of the minute particles of silica into the interstices between the particles of copper, thereby permitting them without serious friction to move over each other in the spreading process. This mixture has sufficient suspending capacity to hold the copper particles from falling therethrough for a considerable length of time after the mixture has been prepared, and at the same time such facility of flowing under the brush as to render the application of the coating comparatively easy, and producing a uniform covering of great weather and moisture resisting capacity.

The paint, after it has hardened on the surface to which it has been applied, has great adhesive qualities and does not flake off or chip as a result of blows, being pliable, as it were, rather than brittle. The paint does not swell and become soft or viscid when exposed to moisture as do ordinary paints, but maintains its hardness. The paint upon being rubbed or brushed presents a metallic luster, exposing the surface of the particles of copper, which under the influence of the elements cover themselves with the various oxids and carbonates of copper, and thereby become " passive."

For convenience in the manufacture and distribution of this paint, it is proposed to mix the lead hydrate, silica and granulated copper together in the proper proportions in a dry state, preferably by tumbling, and to ship them separately from the liquid ingredients, which will be mixed together and shipped in a separate package. A proper quantity of the dry ingredients mixed with a proper quantity of the liquid ingredients will form the paint ready for use. If desired, the dry ingredients may be mixed with a small quantity of non-drying oil, such as any of the ordinary non-drying vegetable oils, into a paste or putty-like mass for packing and shipping. The preferred package for shipping the paint consists of a bi-partite package having two separated compartments, the one containing the dry ingredients, the other containing the liquid ingredients. In this form of package the contents may be preserved indefinitely, and conveniently shipped to the place of use and there the correct quantities of the dry and liquid ingredients are found ready for mixture and use.

It is to be understood that the present invention is intended to cover a metal-bearing paint of which the ingredients are respectively the chemical and mechanical equivalents of the ingredients above set forth. Thus, for example, in place of lead hydrate, white lead or zinc white may be used; in place of silica, other metal suspending ingredients may be substituted; the ingredient of linseed oil, while it is preferred because of the tenacious qualities of the paint secured by its use may be omitted, and for the ingredient of varnish other suitable binding agents may be substituted. The degree of fineness of the copper is not essential, as the desirable fineness depends more or less upon the hardness of the copper; thus, with a harder copper a higher mesh may be employed, and in case of a softer copper a lower mesh. The practical limit, is, however, reached when the particles are finer than 100 mesh, because such particles are liable to be completely oxidized in the hardening of the paint, a condition obviously objectionable and repugnant to the possession by the paint of the qualities which it is desired the paint shall have. Furthermore, the invention is not limited to the employment of copper particles, as finely granulated lead, aluminum, nickel, or their alloys, or lead sulfid, for example, may be employed in the production of the paint with satisfactory results. In the making of paint to resist the action of sulfurous gases, lead sulfid is desirable because the high percentage of sulfur combined therein diminishes the affinity of the material for the sulfurous gases, and a paint containing lead sulfid, would be desirable therefore for use upon train-sheds and railway bridges, and other places exposed to the action of sulfurous gases. The identity of the paint is not destroyed by the introduction of additional diluents, such, for example, as turpentine, which it is desirable to add when the paint is to be applied to the surface to be covered in damp or foggy weather, as it contributes to the rapidity of oxidation.

Having thus described the invention, what is claimed is:—

1. A metal-bearing paint consisting of lead soap forming ingredients, granulated metal, and a metal-suspending ingredient, substantially as described.

2. A metal-bearing paint consisting of a binder comprising lead hydrate and varnish mixed with granulated metal and pulverulent silica, substantially as described.

3. A metal-bearing paint consisting of a binder comprising lead hydrate, varnish and raw linseed oil, mixed with granulated metal and pulverulent silica, substantially as described.

4. A metal-bearing paint consisting of a varnish binder, angular particles of granulated copper, and an inert non-metallic pulverulent mineral, substantially as described.

In testimony whereof I affix my signature, in presence of two witnesses.

GEORGE D. COLEMAN.

Witnesses:
 HORACE VAN EVEREN,
 FARNUM F. DORSEY.